Dec. 1, 1959  E. R. COX  2,915,119
AUTOMOBILE WINDOW SCREEN
Filed Nov. 19, 1958
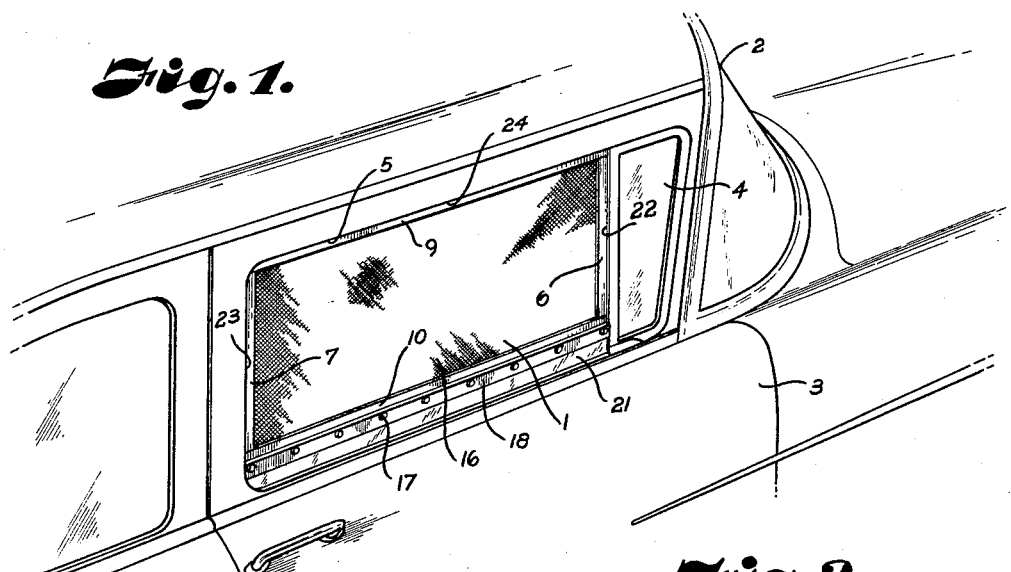
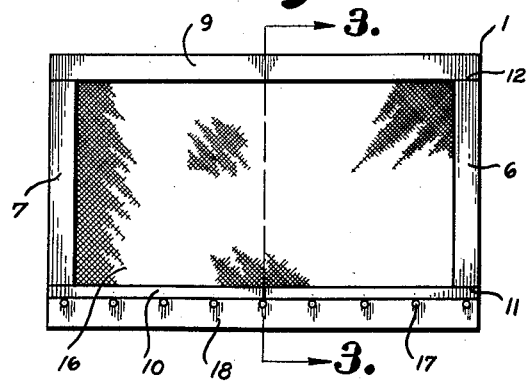
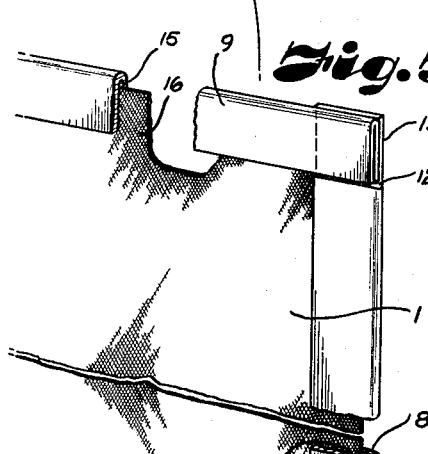
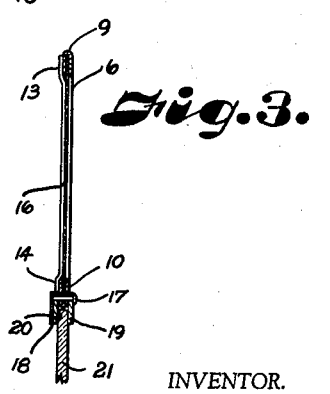
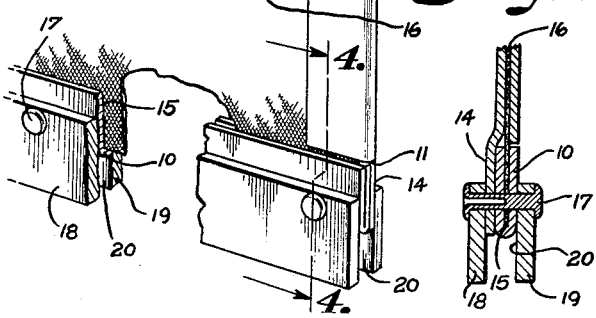
INVENTOR.
Ethel Ruth Cox.
BY Fishburn & Gold
ATTORNEYS.

United States Patent Office 2,915,119
Patented Dec. 1, 1959

2,915,119

AUTOMOBILE WINDOW SCREEN

Ethel Ruth Cox, Oklahoma City, Okla.

Application November 19, 1958, Serial No. 775,063

1 Claim. (Cl. 160—381)

This invention relates to an automobile window screen, and more particularly to a screen to fit the window opening and engageable on the glass panel closure of the door or window of the car to close the opening and allow ventilation in the automobile or other vehicle.

The principal object of the present invention is to provide a frame for a screen or the like which will fit in the window opening of an automobile and having a longitudinal groove on the lower edge for engaging over the window glass panel of the car door and which may be moved upwardly with the window glass panel by the raising mechanism of the vehicle to close the window opening and allow ventilation in the vehicle.

Other objects of the present invention are to provide a frame for the screen portion of the device of light construction; to provide the lower side edge of the frame with spaced flanges depending from the lower edge of the screen frame providing a longitudinal groove in the lower side of the screen frame for engaging the top edge of the glass panel of the window or door of the vehicle; to provide the side edges of the frame so as to engage in the groove of the sides of the window opening to guide the screen frame upwardly as the screen is raised by the glass window of the door; to provide the upper edge of the screen frame with a thin strip sufficient to fit in the groove of the upper edge of the opening of the door of the vehicle when the screen is closed so that the screen will fit snugly in the window opening; and to provide a device of this character simple and economical to manufacture which will fit a window of an automobile and close the same to allow ventilation therein and to prevent insects from entering the vehicle.

In accomplishing these and other objects of the present invention, I have provided improved details of structure, the preferred forms of which are shown in the accompanying drawings, wherein:

Fig. 1 is a perspective view of my window screen shown attached to an automobile and with the window opening closed.

Fig. 2 is a front view of the window screen.

Fig. 3 is a cross sectional view taken on the line 3—3, Fig. 2.

Fig. 4 is a cross sectional view taken on the line 4—4, Fig. 5.

Fig. 5 is an enlarged fragmentary view of the window screen particularly illustrating the construction of the framework.

Referring more in detail to the drawings:

It will be obvious that my window screen may be adapted to fit any type of vehicle but is particularly adaptable for use with vehicles in which the occupants sleep, such as station wagons and the like. It will also be obvious that while I have here shown the window screen attached to the front window of a car door of an automobile, it may also be adapted for use in any window opening of the vehicle in which the glass panel is movable vertically.

1 designates a window screen embodying the features of my invention adapted for use in the door of an automobile or other vehicle 2. Usually the front doors 3 of the vehicle have a movable or rotatable front portion 4 of the window. The door has an opening 5 in which the window screen 1 is adapted to engage.

The frame consists of side rails 6 and 7 preferably constructed of metal or the like, such as aluminum, and is of U-shaped construction as indicated at 8 (Fig. 5). The frame also includes a U-shaped top member 9 and a U-shaped bottom member 10. The upper and lower end of the side rails 6 and 7 have one of their U-shaped flanges cut away, as indicated at 11 and 12 (Fig. 5). The extended ends 13 and 14 of each side rail are bent laterally slightly, as best illustrated in Fig. 3, to accommodate the U-shaped top and bottom members 9 and 10. The rails are secured together by spot welding or other suitable means. This provides the U-shaped side and top and bottom rails with inwardly facing grooves 15 extending entirely around the frame for receiving the screen member 16. The screen 16 is also secured in the framework by spot welding or other suitable means such as rivets or the like (not shown).

Secured to the lower or bottom member 10 by rivets or the like 17 are spaced flanges 18 and 19 providing a longitudinal groove 20 therebetween for receiving the top edge of the glass panel 21 (Fig. 3) of the window opening in the door which is usually provided with mechanism (not shown) for moving the glass panel up and down in the window opening 5.

In operation of the device constructed and assembled as described, the window glass panel 21 is moved downwardly by the door mechanism (not shown) a sufficient distance to allow the frame of the window screen 1 to enter the window opening and the lower edge of the frame is placed over the top edge of the glass door as best illustrated in Fig. 3 with the side rails 6 and 7 engaging in the grooves 22 and 23 of the forward and rear sides of the window opening. As the window glass panel 21 is moved upwardly, the upper rail 9 of the screen frame will enter the groove 24 in the top of the window opening 5 of the door 3 of the automobile, and the frame will be held securely in the window opening, thus allowing ventilation of the interior of the vehicle and preventing insects from entering the vehicle, as well as preventing prowlers from entering and opening the window of the vehicle and unlocking the door should the window be left open for ventilation.

While I have shown one form of the structure of the screen frame, other forms may be utilized without departing from the spirit of my invention. The frame may also be made of plastic or other suitable material.

It will be further obvious from the foregoing that I have provided an improved window screen frame for engaging in the opening of an automobile door or window opening slidable on the glass panel of such door for ventilating the interior of the vehicle.

What I claim and desire to secure by Letters Patent is:

A screen frame for a window opening of the door of a vehicle having a glass panel slidable in grooves of the frame of the window of the door comprising, U-shaped side rails and top and bottom members, one leg of each end of said side rails being cut away and the ends of the other legs being bent laterally outwardly and then extending downwardly beyond the cut off leg portion, said top and bottom members engaging the inside of the extended portion of the extended leg and the edge of the cut off portion of the other leg, means securing said rails and members together at their respective ends providing an inwardly facing groove, a screen having its edges engaging in said groove, means securing said screen in said groove, a flange engaging the outside of the extended leg portion of said bottom member and extending below the lower edge thereof, a flange engaging one leg of the U-shaped bottom member, and rivets extending through the top edges of said flanges, the extended leg portion, the U-shaped bottom member and said screen to provide a groove along the lower edge of the frame for engaging the top edge of said glass panel whereby the screen frame may be moved vertically in said window opening along with the glass panel to close said opening.

References Cited in the file of this patent

UNITED STATES PATENTS

| | | |
|---|---|---|
| 1,487,335 | Jaeger | Mar. 18, 1924 |
| 1,619,501 | Evans | Mar. 1, 1927 |
| 1,712,341 | Fisher | May 7, 1929 |
| 1,814,322 | McCormack | July 14, 1931 |
| 2,540,504 | Beneteau | Feb. 6, 1951 |
| 2,549,234 | Puffer | Apr. 17, 1951 |